(12) United States Patent
Amuru et al.

(10) Patent No.: US 11,212,718 B2
(45) Date of Patent: Dec. 28, 2021

(54) USER EQUIPMENT (UE) AND METHOD FOR PERFORMING RANDOM ACCESS FOR BEAMFORMING-BASED CONNECTED MODE HANDOVER

(71) Applicant: Samsung Electronics Co., Ltd., Suwon-si (KR)

(72) Inventors: Saidhiraj Amuru, Bangalore (IN); Atanu Guchhait, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 16/471,366

(22) PCT Filed: Dec. 26, 2017

(86) PCT No.: PCT/KR2017/015434
§ 371 (c)(1),
(2) Date: Jun. 19, 2019

(87) PCT Pub. No.: WO2018/124675
PCT Pub. Date: Jul. 5, 2018

(65) Prior Publication Data
US 2020/0092768 A1 Mar. 19, 2020

(30) Foreign Application Priority Data
Dec. 26, 2016 (IN) .............................. 201641044292
Dec. 18, 2017 (IN) .............................. 2016 41044292

(51) Int. Cl.
*H04W 36/00* (2009.01)
*H04L 5/00* (2006.01)
*H04W 74/08* (2009.01)

(52) U.S. Cl.
CPC ....... *H04W 36/0072* (2013.01); *H04L 5/0053* (2013.01); *H04W 36/0058* (2018.08); *H04W 74/0833* (2013.01); *H04W 74/0891* (2013.01)

(58) Field of Classification Search
None
See application file for complete search history.

(56) References Cited

U.S. PATENT DOCUMENTS

2010/0142485 A1   6/2010  Lee et al.
2010/0330993 A1* 12/2010  Kone ................ H04W 36/0055
                                                   455/436
(Continued)

FOREIGN PATENT DOCUMENTS

CN        106134236 A      11/2016
KR     10-2009-0017379 A    2/2009
(Continued)

OTHER PUBLICATIONS

Sony, Considerations on Multiple Beams RACH Procedure, 3GPP TSG Ran WG1 Meeting #87, R1-1612890, Reno, USA, See section 2, Nov. 4, 2016.
(Continued)

*Primary Examiner* — Alpus Hsu
*Assistant Examiner* — Camquyen Thai
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for Internet of Things (IoT) are described. Embodiments may be applied to intelligent services based on the 5G communication technology and the IoT-related technology, such as smart home, smart building, smart city, smart car, connected car, health care, digital education, smart retail, security and safety services. Described aspects
(Continued)

include a method of performing a random access procedure for a connected mode handover by a User Equipment (UE). The method includes transmitting a measurement report associated with a target gNB to a source gNB, wherein the UE performs measurement of the target gNB for one of SS blocks and Channel State Information Reference Signal (CSI-RS) as indicated to the UE by the source gNB.

10 Claims, 12 Drawing Sheets

(56) References Cited

U.S. PATENT DOCUMENTS

| | | | |
|---|---|---|---|
| 2011/0183669 A1* | 7/2011 | Kazmi | H04J 11/0086 455/434 |
| 2013/0155847 A1* | 6/2013 | Li | H04W 76/10 370/225 |
| 2014/0169345 A1* | 6/2014 | Seo | H04L 5/0073 370/336 |
| 2015/0201356 A1 | 7/2015 | Wang et al. | |
| 2016/0029358 A1 | 1/2016 | Hou et al. | |
| 2016/0127929 A1 | 5/2016 | Racz et al. | |
| 2016/0183173 A1 | 6/2016 | Harada et al. | |
| 2016/0330659 A1* | 11/2016 | Zhu | H04W 36/0077 |
| 2017/0033854 A1 | 2/2017 | Yoo | |
| 2017/0181134 A1* | 6/2017 | Niu | H04B 17/318 |
| 2017/0257780 A1 | 9/2017 | Ryoo et al. | |
| 2017/0295502 A1* | 10/2017 | Stirling-Gallacher | H04B 7/024 |
| 2017/0325057 A1 | 11/2017 | Zhang et al. | |
| 2017/0338923 A1* | 11/2017 | Prasad | H04L 5/0023 |
| 2018/0103492 A1* | 4/2018 | Akkarakaran | H04W 56/001 |
| 2018/0115940 A1* | 4/2018 | Abedini | H04L 27/2666 |
| 2018/0139784 A1 | 5/2018 | Ryoo et al. | |
| 2018/0359653 A1* | 12/2018 | Svedman | H04W 24/10 |
| 2019/0215125 A1* | 7/2019 | Da Silva | H04W 16/28 |
| 2019/0335517 A1* | 10/2019 | Reial | H04W 16/28 |

FOREIGN PATENT DOCUMENTS

| | | |
|---|---|---|
| KR | 10-2016-0142054 A | 12/2016 |
| WO | 2016/043502 A1 | 3/2016 |
| WO | 2016-115711 A1 | 7/2016 |

OTHER PUBLICATIONS

Indian Office Action dated Mar. 20, 2020, issued in a counterpart Indian Application No. 201641044292.

Extended European Search Report dated Jun. 19, 2020, issued in a counterpart European Application No. 17887101.8-1212/3545706.

Samsung: "4-step RACH procedure discussion", 3GPP Draft; R1-1710636, 3rd Generation Partnership Project (3GPP), vol. Ran WG1, No. XP051304316; Jun. 16, 2017, Qingdao, China.

Samsung et al: "UE requirements before and during handover", 3GPP Draft; R2-1705381; UE Requirements During Ho V01,3rd Generation Partnership Project (3GPP), vol. Ran WG2, No. XP051275797; May 14, 2017, Hangzhou, China.

Chinese Office Action dated Mar. 11, 2021, issued in Chinese Application No. 201780078991.7.

Intel Corporation, "Mobility type support for multiple beams in NR", R2-168512, 3GPP TSG RAN WG2 Meeting #96, Reno, Nevada, Nov. 5, 2016.

3rd Generation Partnership Project; Technical Specification Group Radio Access Network; Study on New Radio (NR) Access Technology Physical Layer Aspects (Release 14), 3GPP TR 38.802 V1.0.0 (Nov. 2016), R1-1613687, Nov. 19, 2016.

NTT Docomo, Inc., "RAN2 aspects on random access procedure for NR", R2-168035, 3GPP TSG-RAN WG2 #96, Reno, USA, Nov. 5, 2016.

Korean Office Action dated Sep. 15, 2021, issued in Korean Application No. 10-2019-7017814.

* cited by examiner

USER EQUIPMENT (UE) AND METHOD FOR PERFORMING RANDOM ACCESS FOR BEAMFORMING-BASED CONNECTED MODE HANDOVER

TECHNICAL FIELD

The present disclosure relates to wireless communication and more particularly to a method of performing random access procedure for beamforming-based connected mode handovers. The present application is based on, and claims priority from an Indian Application Number. 201641044292 filed on 26 Dec. 2016, the disclosure of which is hereby incorporated by reference herein.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Generally, mobile communication systems have been developed to provide communication services while guaranteeing mobility of users. With the dramatic development of technologies, the mobile communication systems are now capable of providing high-speed data communication services as well as voice communication services. Long term evolution (LTE) is a technology for implementing packet-based communication at a higher data rate of a maximum of about 100 Mbps. In order to meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post LTE system'. The current 4G systems operate in sub-6 GHz spectrum bands where transmission and reception is performed in an omni-directional manner. The 5G communication system is considered to be implemented in higher frequency (mmWave) bands, e.g., 60 GHz bands, so as to accomplish higher data rates.

However for the future 5G systems, above 6 GHz bands is a potential spectrum for operation. In such bands, it has been shown that beamforming is necessary for successful communications to be performed. In such cases several existing procedures for UE and base station communication, for that matter any two nodes, must change accordingly. One such procedure is the random access procedure.

In LTE systems, the UE performs an initial access procedure by scanning for PSS, SSS and then synchronizes in the downlink After synchronization, random access procedures are performed by the UE in order to acquire uplink synchronization to send uplink transmissions appropriately. While this is generally a contention-based procedure, where a UE has to contend with several other users in order to successfully be heard by the base station, there is another procedure for random access known as contention-free random access in which the UE is provided with dedicated resources for sending a random access preamble to the base station for uplink synchronization. This procedure is more applicable during inter base station handover. In such case, in order for the UE to uplink synchronize with the target base station when handing over from the source base station, the connection must be seamless. For this, dedicated resources are allocated by target base station to the UE over which the UE sends the random access preamble. This minimizes the latency involved in this procedure.

FIG. 1 illustrates an example RACH procedure for beam formed systems in 5G systems, The RACH procedure is performed after DL synchronization phase. The UE performs this procedure with a Transmission reception point (TRP) inside a cell area which is under control of one 5G systems base station (gNB) or with a gNB itself. Since, the best beams are unknown during initial access, beam sweeping based mechanisms are necessary during the initial access RACH procedures. However, performing this procedure during handover from source gNB to target gNB will be slow. Hence, an additional mechanism for improving the same is needed. This mechanism however depends on how the inter gNB measurements are performed.

For the UE which is connected to a source gNB, it has a best beam pair. After receiving a handover request from the source gNB, the UE has to perform measurements for a neighboring cell. Since the best beams are unknown in this case, the UE has to scan all possible directions to find the inter cell measurements. The inter-cell measurement options that can be used for 5G are as described herein.

a) Synchronization Signal (SS block) based b) Channel State Information Reference Signal (CSI-RS) based Option (a) is synchronization signal (SS block) based. In this case, all ports of the gNB send the same SS signal at the same time in a correlated direction. For example, all beams neighboring to each other will form the correlated beam. In this manner, while beams from each port are narrow, the overall effect of sending the same SS along the correlated direction creates a wider beam. Unlike to option (a), the option (b) relies only on the narrow beams formed using the CSI-RS. In other words, all ports of the gNB send the SS and the CSI-RS in different directions at a given time instant. In such a scenario, the UE can see only one beam at a particular direction.

FIG. 2 illustrates an example of SS block based (wide beam) and CSI-RS based (narrow-beam) used for measurements, according to the embodiments as disclosed herein. The CSI-RS is used for measuring the beam quality on each beam while SS block is mainly used for synchronization purposes. Hence, the CSI-RS based measurements are usually effective for improving data connection and data speeds when the UE has already synchronized in DL and UL. Relying on CSI-RS based inter cell measurements can delay the process as the UE has to search for several beams before finding the best beam for latching. However, using SS block based composite beam, when used is a wide beam and can enable faster measurements for UE. Once measurement is completed, then UE can search inside the wide beam for the best CSI-RS beam to improve data connection quality. However, it should be noted that each of the above mentioned techniques have a tradeoff. Because all the ports have to send beams in same direction, then the coverage in angular direction is reduced for the gNB when the number of ports is fixed. This improves fast and enhanced cell measurements. The CSI-RS based method enables wide angular coverage for the gNB but slower for the inter-cell measurements. However, this depends on network implementation on how the gNB can resolve the tradeoff. The gNB can then choose that only some beams are sent in same direction across all available ports and still ensure that the coverage is reasonable. Therefore, the following observations are noted.

SS block-based beams:
These beams are transmitted on a set of beams that are coherent/correlated
Same SSS enables faster initial access
Forms a logical-sector
Better enhanced cell measurements and smaller ping-pong rates
However, the gNB has to transmit the beams along same direction
May compromise the coverage along other directions
More of a network planning issue
CSI-RS based beams:
These beams are Narrow beams
Orthogonal cover-code (OCC)-based port-based beams
Can be in different directions to span various directions
More number of ping-pong and handover
Better for faster data association after handover It should be noted that the composite beam is a wide beam and either physically make a wide beam (or) it represents a same signal transmitted on several beams (close by) simultaneously.

The RACH procedures are described by considering both these inter-cell measurement mechanisms and depending on whether or not the UE and source gNB have beam reciprocity (also known as beam correspondence). The concept of Beam correspondence is defined as follows:

Tx/Rx beam correspondence at the gNB/TRP holds if at least one of the following is satisfied:
TRP is able to determine a TRP Rx beam for the uplink reception based on UE's downlink measurement on TRP's one or more Tx beams.
TRP is able to determine a TRP Tx beam for the downlink transmission based on TRP's uplink measurement on TRP's one or more Rx beams Tx/Rx beam correspondence at UE holds if at least one of the following is satisfied:
The UE is able to determine a UE Tx beam for the uplink transmission based on UE's downlink measurement on UE's one or more Rx beams.
The UE is able to determine a UE Rx beam for the downlink reception based on TRP's indication based on uplink measurement on UE's one or more Tx beams.

Before performing the RACH procedure, it is necessary for the UE to determine which beam to be used for handover purposes i.e., which beam the UE uses for initiating the inter cell measurements. The following options are provided.

Option 1: The UE to perform measurements on the same beam it uses for the connection in the source gNB/source cell.

Option 2: The UE performs measurements on all beams which is complex and time consuming.

Since the above options have certain advantages and disadvantages, either of the above procedures can be implemented. However, the measurement report gaps must be appropriate depending on each mechanism. Since the timeline needed for perform measurements on the same beam is smaller than performing the measurements on all the beams, a system level analysis has to be performed. The example procedures are shown below in FIGS. 3 to 5. It should be noted that the FIGS. 4 and 5 can be replaced to consider Option 1 above where the UE uses only the best beam of the source cell to make measurements of the inter-cell measurements as well. The FIG. 3 illustrates the UE 102 connected with the source gNB on its bets beam pair.

FIG. 4 illustrates the UE 102 performing DL measurements of the target gNB on composite beam by using all of its beams and FIG. 5 illustrates the UE 102 performing DL measurements of the target gNB on narrow CSI-RS beam by using all of its beams.

After performing the measurements of the target gNB 104*b*, the UE 102 performs RACH procedure during handover from the source gNB 104*a* to the target gNB which will be slow. Hence, an additional mechanism for improving the RACH procedure during handover is needed.

The multi stage contention-based beamforming based random access procedures have been addressed for 5G systems. However the contention-free random access procedures needed for handovers in 5G are to be addressed.

The above information is presented as background information only to help the reader to understand the present invention. Applicants have made no determination and make no assertion as to whether any of the above might be applicable as Prior Art with regard to the present application.

DISCLOSURE OF INVENTION

Technical Problem

The principal object of the embodiments herein is to provide a User Equipment (UE) and method of performing random access procedure for beam-forming based connected mode handovers.

Another object of the embodiments herein is to provide a method for performing measurement of a target gNB for one of SS blocks and Channel State Information Reference Signal (CSI-RS) as indicated to the UE by a source gNB.

Another object of the embodiments herein is to provide a method for receiving a handover command from the source gNB, indicating the random access to be performed on one of the SS blocks and the CSI-RS.

Another object of the embodiments herein is to provide a method for receiving an uplink (UL) allocation request message for obtaining timing alignment (TA) from the target gNB.

Another object of the embodiments herein is to provide a method of performing the random access procedure for handover to the target gNB using Random Access Channel (RACH) resources indicated in the UL allocation request.

Another object of the embodiments herein is to provide the handover command which includes an association of RACH resources and CSI-RS configurations.

Another object of the embodiments herein is to provide the handover command which includes an association of RACH resources and SS blocks.

Another object of the embodiments herein is to perform downlink (DL) synchronization with the target gNB using one of the SS blocks and the CSI-RS as indicated to the UE in the handover command.

Another object of the embodiments herein is to indicate the random access procedure for handover to the target gNB in the UL allocation request message using dedicated RACH resources.

Another object of the embodiments herein is to provide contention free random access procedures and to reduce latency.

Solution to Problem

Accordingly embodiments herein provide a method of performing a random access procedure for a connected mode handover, by a User Equipment (UE). The method includes transmitting a measurement report associated with a target gNB to a source gNB, wherein the UE performs measurement of the target gNB for one of SS blocks and Channel State Information Reference Signal (CSI-RS) as indicated to the UE by the source gNB. The method includes receiving a handover command from the source gNB indicating the random access to be performed on one of the SS blocks and the CSI-RS. Further, the method includes receiving an uplink (UL) allocation request message for obtaining timing alignment (TA) from the target gNB. Furthermore, the method includes performing the random access procedure for handover to the target gNB using Random Access Channel (RACH) resources indicated in the uplink allocation request.

In an embodiment, measurement report includes a Cell Identifier (ID) and a Beam ID of the target gNB. The measurement report includes measurements of SS blocks and CSI-RS associated with the target gNB.

In an embodiment, the handover command includes an association of RACH resources and CSI-RS configurations.

In an embodiment, the handover command includes an association of RACH resources and SS blocks.

In an embodiment, the UE performs downlink (DL) synchronization with the target gNB using one of the SS blocks and the CSI-RS as indicated to the UE in the handover command.

In an embodiment, the UL allocation request message includes dedicated RACH resources for uplink synchronization with the target gNB.

In an embodiment, the random access procedure for handover to the target gNB is indicated in the UL allocation request message using dedicated RACH resources for the SS blocks and CSI-RS.

Accordingly the embodiments herein provide a UE for performing a random access procedure for a connected mode handover. The UE includes a radio frequency (RF) transceiver configured to transmit a measurement report associated with a target gNB to a source gNB, wherein the UE performs measurement of the target gNB for one of SS blocks and CSI-RS as indicated to the UE by the source gNB. The radio transceiver configured to receive a handover command from the source gNB indicating the random access to be performed on one of the SS blocks and the CSI-RS. The radio transceiver configured to receive an UL allocation request message for obtaining timing alignment (TA) from the target gNB. The radio transceiver configured to perform the random access procedure for handover to the target gNB using RACH resources indicated in the uplink allocation request.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The embodiments of the present invention provide a User Equipment (UE) and method of performing random access procedure for beam-forming based connected mode handovers.

The embodiments of the present invention provide a method for performing measurement of a target gNB for one of SS blocks and Channel State Information Reference Signal (CSI-RS) as indicated to the UE by a source gNB.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which.

MODE FOR THE INVENTION

Figure 1:
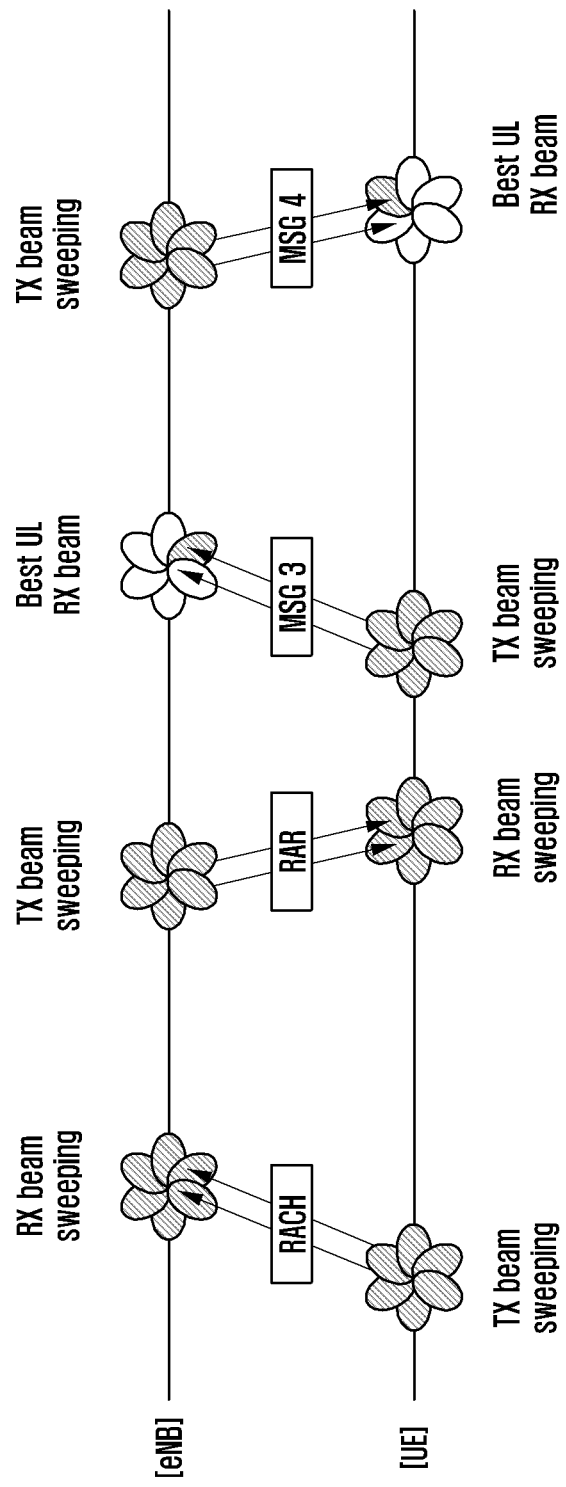
FIG. 1 illustrates an example RACH procedure for beam formed systems in 5G systems.
Figure 2:
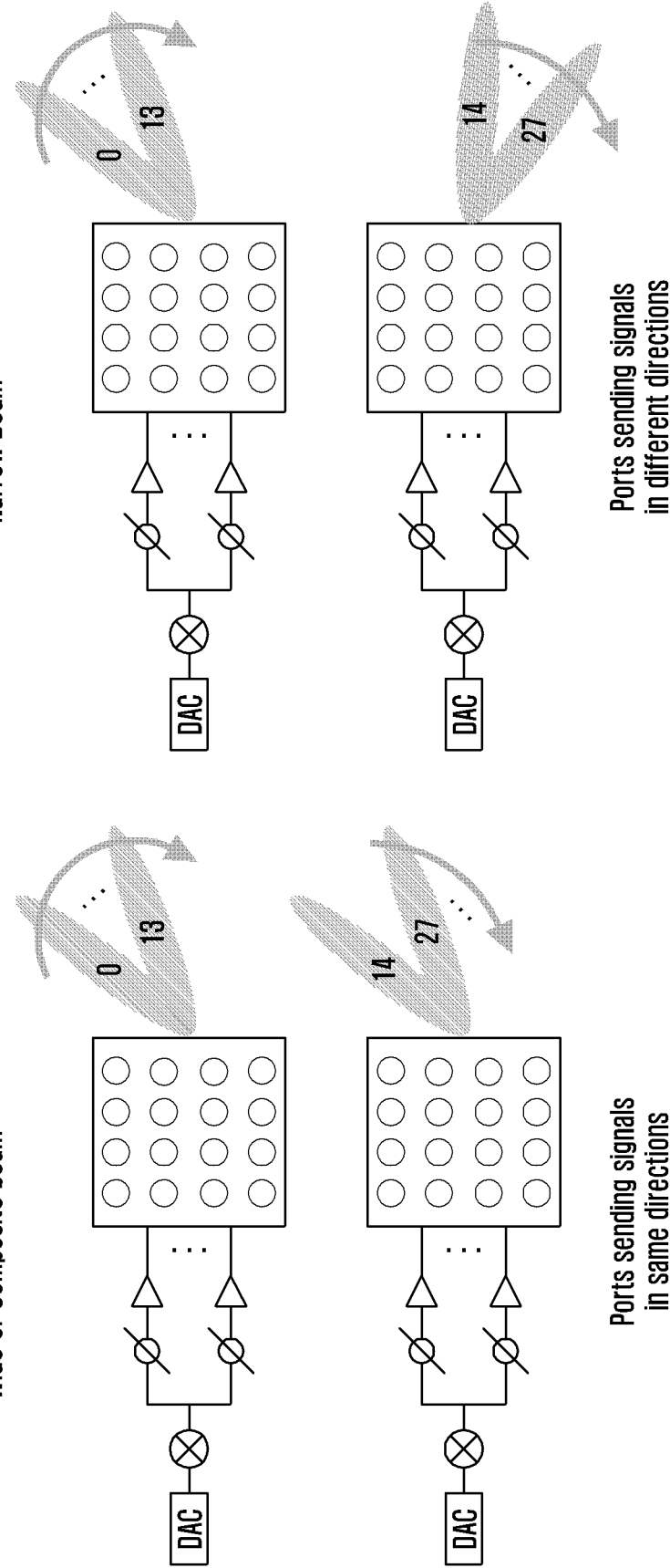
FIG. 2 illustrates an example of SS block based (wide beam) and CSI-RS based (narrow-beam) used for measurements.
Figure 3:
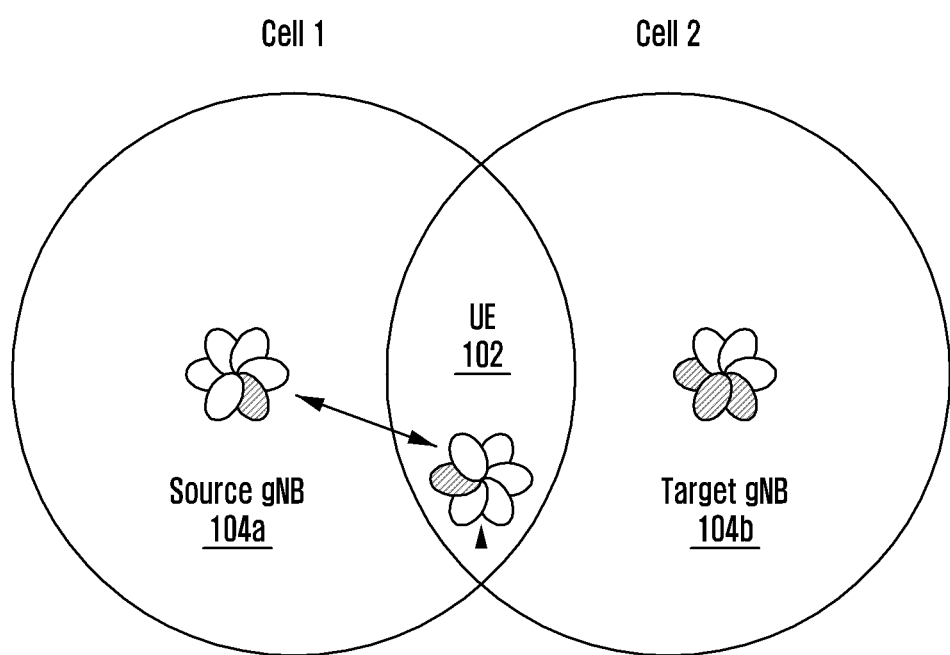
FIG. 3 illustrates a user equipment (UE) connected to a source gNB on a best beam pair.
Figure 4:
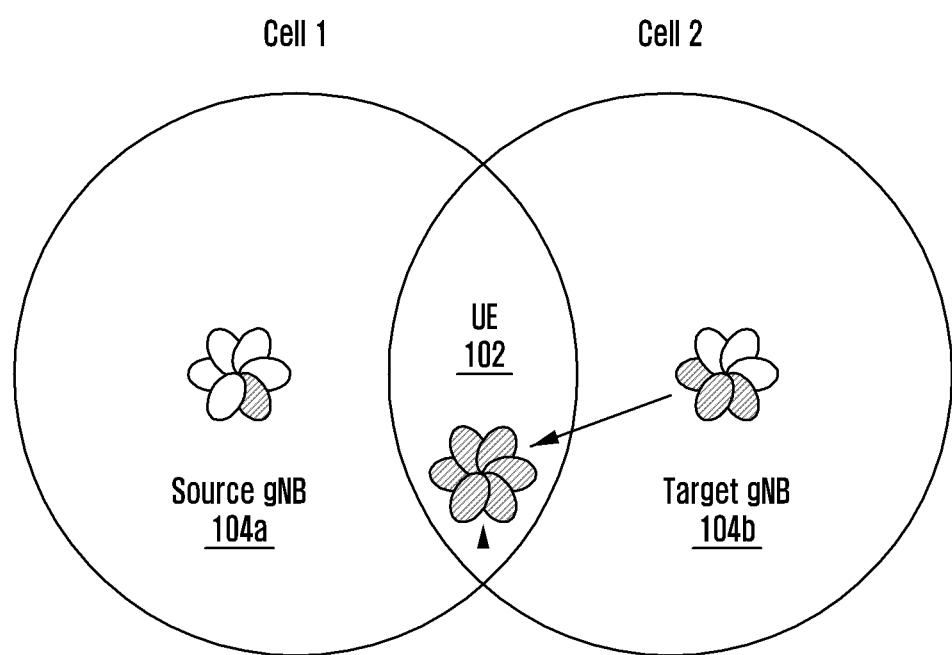
FIG. 4 illustrates the UE performing DL measurements of source gNB on composite beam by using all of its beams.
Figure 5:
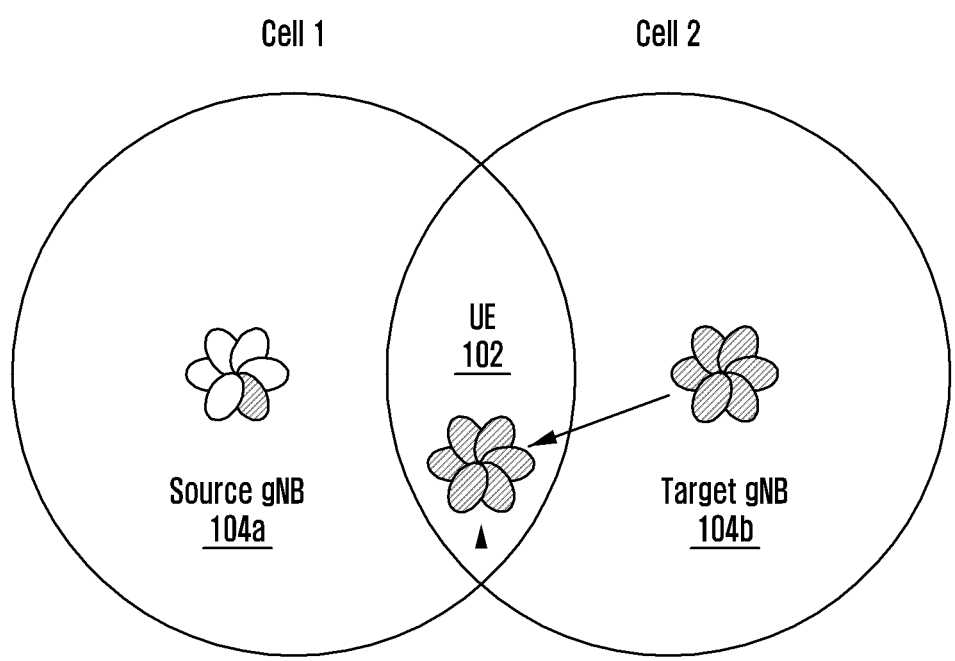
FIG. 5 illustrates the UE performing DL measurements of source gNB on narrow CSI-RS Beam by using all of its beams.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term UE used in the description can include, for e.g., cellular telephones, smartphones, mobile stations, personal computers (PCs) and minicomputers, whether desktop, laptop, or otherwise, as well as mobile devices such as handheld computers, PDAs, personal media devices (PMDs), or the like.

The UE may support multiple Radio access technologies (RAT) such as, for e.g., CDMA 1XA, GPRS, EvDO, TDMA, GSM, WiMax technology, LTE, LTE Advanced and 5G communication technologies.

The embodiments herein provide a method of performing a random access procedure for a connected mode handover by a User Equipment (UE). The method includes transmitting a measurement report associated with a target gNB to a source gNB, wherein the UE performs measurement of the target gNB for one of SS blocks and Channel State Information Reference Signal (CSI-RS) as indicated to the UE by the source gNB. The method includes receiving a handover command from the source gNB indicating the random access to be performed on one of the SS blocks and the CSI-RS. Further, the method includes receiving an uplink (UL) allocation request message for obtaining timing alignment (TA) from the target gNB. Furthermore, the method includes performing the random access procedure for handover to the target gNB using Random Access Channel (RACH) resources indicated in the uplink allocation request.

Unlike to the conventional methods, the proposed method can be used for random access procedures and configurations for beamforming-based connected mode handovers. The proposed method of random access depends on the techniques used for performing neighbor cell/inter 5G base station measurements. Depending on these techniques used, the proposed method can be used for reducing the latency while considering the validity of beam reciprocity at various nodes. Further, the proposed method provides mechanism for the random access preamble re-transmission which are needed for successful random access procedures and its adaptation to the mmWave beamforming cellular technologies.

The proposed method herein is applicable for any future wireless technologies that can be built upon beamforming based systems. It should be noted that irrespective of the exact signals used i.e., SS block and CSI-RS, the embodiments in the proposed method and system are applicable for all cases where wide beams and/or narrow beams are used.

Referring now to the drawings, and more particularly to FIGS. 6 through 13, there are shown preferred embodiments.

Figure 6:
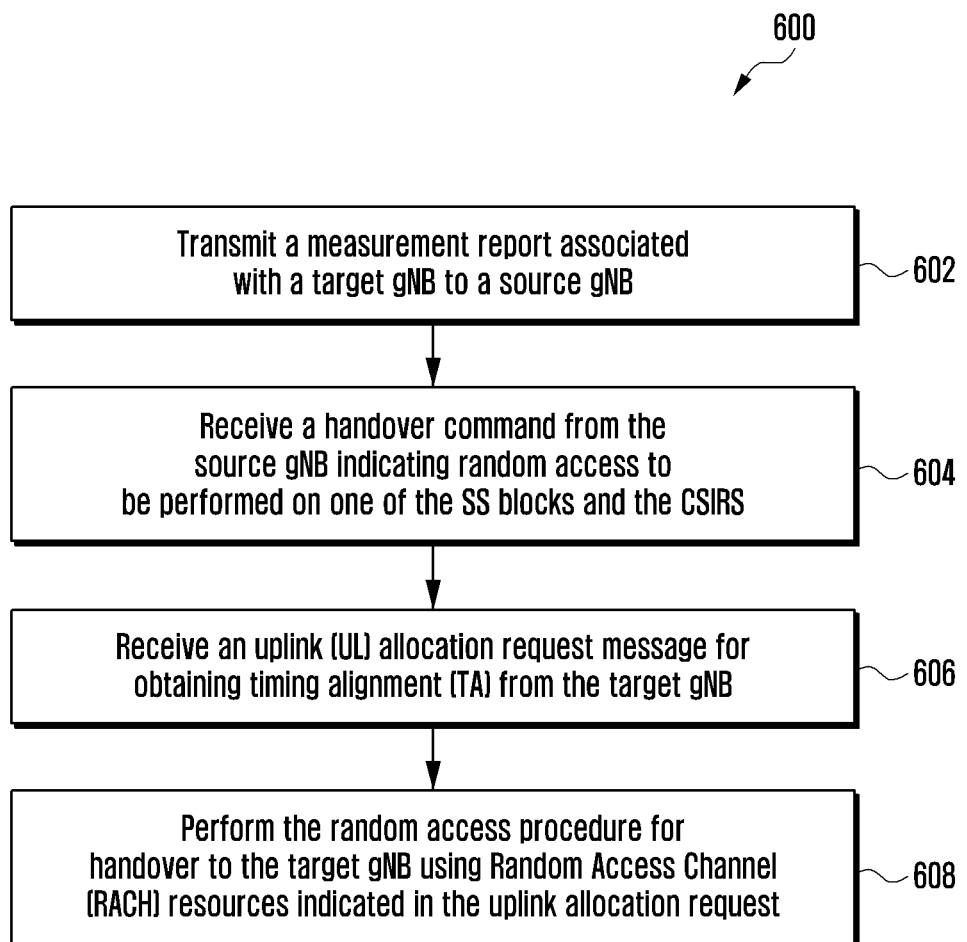
FIG. 6 is a flow chart illustrating a method of performing the random access procedure for a connected mode handover by the UE, according to an embodiment as disclosed herein.

FIG. 6 is a flow chart 600 illustrating a method of performing the random access procedure for a connected mode handover by the UE 102, according to an embodiment as disclosed herein. At step 602, the method includes transmitting the measurement report associated with the target gNB 104b to the source gNB 104a. The UE 102 performs measurement of the target gNB 104b for either of SS blocks and the (CSI-RS as indicated to the UE 102 by the source gNB 104a. After performing the measurement of the target gNB 104a, the UE 102 transmits the measurement report associated with the target gNB 104b to the source gNB 104a. The measurement report includes the Cell ID and the Beam ID of the target gNB 104.

At step 604, the method includes receiving the handover command from the source gNB 104a indicating the random access to be performed on either the SS blocks or the CSI-RS. After receiving the measurement reports from the UE 102, the source gNB 104a transmits the handover command indicating the random access to be performed on either the SS blocks or the CSI-RS to the UE 102. The handover command includes an association of RACH resources and CSI-RS configurations and an association of RACH resources and SS blocks.

At step 606, the method includes receiving the UL allocation request message for obtaining the TA from the target gNB 104b. The UE 102 receives the UL allocation request message for obtaining the TA from the target gNB 104b. The UL allocation request message includes RACH resources. It should be noted that the random access procedure for the handover to the target gNB 104b is indicated in the UL allocation request message using dedicated RACH resources for the SS blocks and CSI-RS.

At step 608, the method includes performing the random access procedure for handover to the target gNB 104b using RACH resources indicated in the UL allocation request message. The UE 102 performs the random access procedure for handover to the target gNB 104b using the RACH resources indicated in the UL allocation request message.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
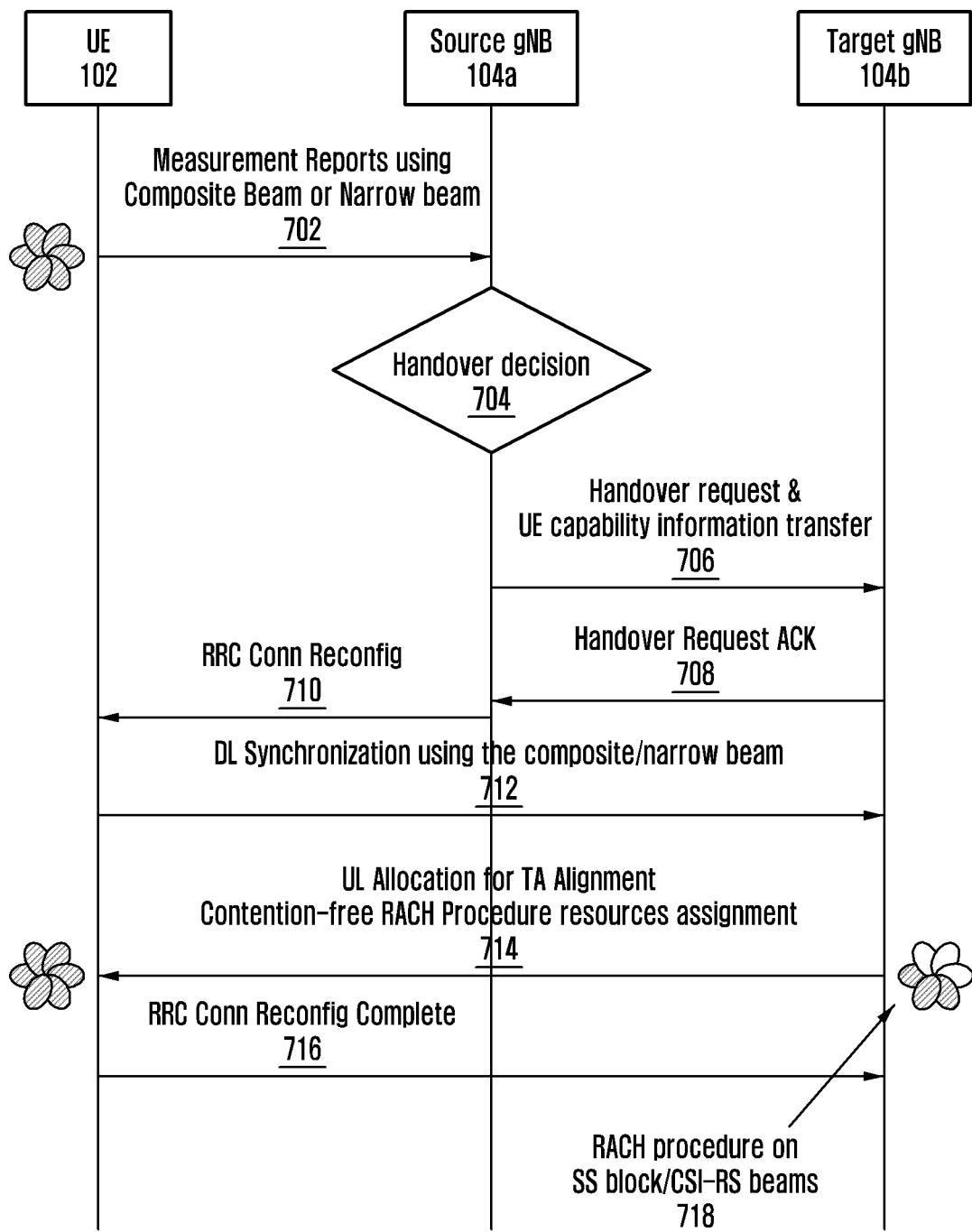
FIG. 7 is a sequence diagram showing various signaling messages in the connected mode handover, according to an embodiment as disclosed herein.
Figure 8:
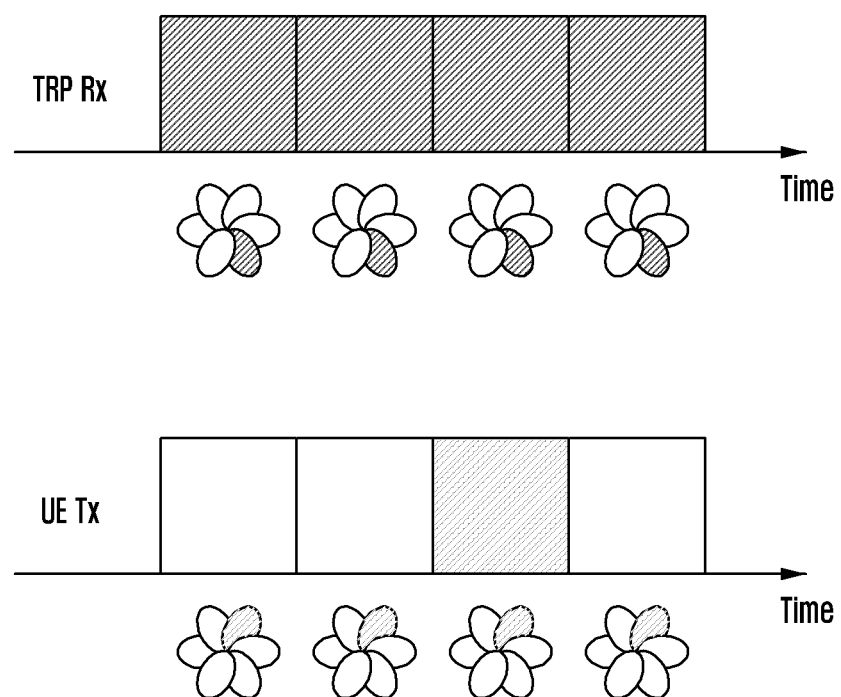
FIGS. 8-11 illustrate various formats of Message 1 (RACH Message), according to an embodiment as disclosed herein.

FIG. 7 is a sequence diagram showing various signaling messages in the connected mode handover (HO), according to an embodiment as disclosed herein.

Referring to the FIG. 7, the UE 102 is in connected mode with the source gNB 104a.

When the UE is in the connected mode, the UE 102 performs measurements of the target gNB 104b either on the SS blocks or on the CSI-RS as indicated to the UE by the source gNB 104a.

The following are the details which are obtained during the measurement of the target gNB 104b.

With SS block based composite beam:

Cell ID is identified using secondary synchronization signal (SSS)

During HO process, the beam ID is identified:
1. Either explicitly using some beam ID; or
2. Implicitly using the symbol index After HO, the cell ID and the beam ID is identified for RACH procedure With CSI-RS based beams Cell ID identified using SSS During HO process, the CSI-RS beam id is identified Either explicitly using some beam ID; or Implicitly using the symbol index After HO, to use the information for RACH Further, the UE transmits (702) the measurements of the target gNB 104b to the source gNB 104a. When the measurement reports are available at the source gNB 104a (either through SS blocks or through the CSI-RS) the source gNB determines (704) whether the handover has to be performed. Further, the UE receives (706) the handover command from the source gNB 104a indicating the random access to be performed on the SS blocks or the CSI-RS. The handover command message includes association of RACH resources and CSI-RS configurations, the association of RACH resources and SS blocks.

The UE capability information includes the validity of the beam correspondence (which denotes the beam pair on which the UE and the source gNB involved in communication) at the UE 102. Since the source gNB 104a is in the connected mode with the UE 102, the source gNB 104a is aware of the UE's capability information which includes the beam correspondence. The source gNB 104a transmits (706) the handover request message and the capability information of the UE 102, including the beam correspondence to the target gNB 104a.

The target gNB 104b transmits (708) a handover ACK message to the source gNB 104a after receiving the handover request message and the capability information of the UE 102 from the source gNB 104a. The source gNB 104a transmits (710) a RRC connection reconfiguration message to the UE 102.

After receiving the RRC connection reconfiguration message, the UE 102 performs (712) DL synchronization using composite/narrow beams. Further, the UE 102 receives (714) the UL allocation request message for obtaining TA from the target gNB 104b. After receiving the UL allocation message, the UE 102 transmits (716) the RRC connection reconfiguration complete message to the target gNB 104b.

The UE 102 has now the information which includes association of the RACH resources and CSI-RS configurations, the association of RACH resources and SS blocks and the TA. Considering that the above mentioned information is available at the UE 102, the UE 102 performs (718) the contention free RACH procedure. The detailed RACH procedures are explained below.

Initially, consider the case where the source TRP/gNB 104a has the beam correspondence.

For SS block based (i.e., the composite beam),

As the best beam inside the composite beam is not known;

The number of RACH resources is a function of the number of narrow beams inside the composite beam.

Depending on UE beam correspondence or beam reciprocity availability, the UE 102 has to either perform beam sweeping or to perform RACH transmission As the source gNB 104a knows about the UE's capability ability already, it can signal the target gNB 104b to provide appropriate number of RACH resources depending on validity of UE's reciprocity In this procedure, sweeping is much faster than full beam sweep RACH procedure Thus, the number of RACH resources is N_HO or N_HO*M N_HO=number of beams inside the SSS composite beam; and M=number of UE beams, can be signaled via UE capability information For CSI-RS based (i.e., narrow beams)

The RACH procedure needs RACH resources for all UE Tx beams for the single best CSI-RS beam which was detected by the UE 102 (i.e., the best beam of target gNB)

The UE 102 performs beam sweeping on this set of M RACH resources when there is no beam reciprocity With beam reciprocity at the UE 102, the UE 102 performs power ramping.

Only one RACH resource may be assigned

For retransmission, power ramping is used.

Consider the case, where the source TRP/gNB 104a has no beam correspondence. In this scenario, This information (i.e., the source TRP/gNB 104a has no beam correspondence) is signaled through System Information Block (SIB)

The best beam for receiving the UE's preamble may be different for the target gNB 104b from the beam on which UE measured the DL measurement.

The common procedure for both SS based and CSI-RS based mechanisms

With reciprocity at the UE 102 (this information is known by the source gNB 104a and can be indicated to the target gNB 104b)

The UE 102 uses the same beam on which it measures the beams of the target gNB 104b.

But sends multiple preamble for TRP Rx beam sweeping

Without reciprocity at the UE 102:

The beam sweeping is needed from the UE 102 and gNB 104b.

FIGS. 8-11 illustrate various formats of Message 1 (RACH Message), according to an embodiment as disclosed herein. In an embodiment, the MSG1 transmission when the UE 102 and target TRP/gNB 104b have the beam correspondence is as shown in the FIG. 8.

Figure 9:
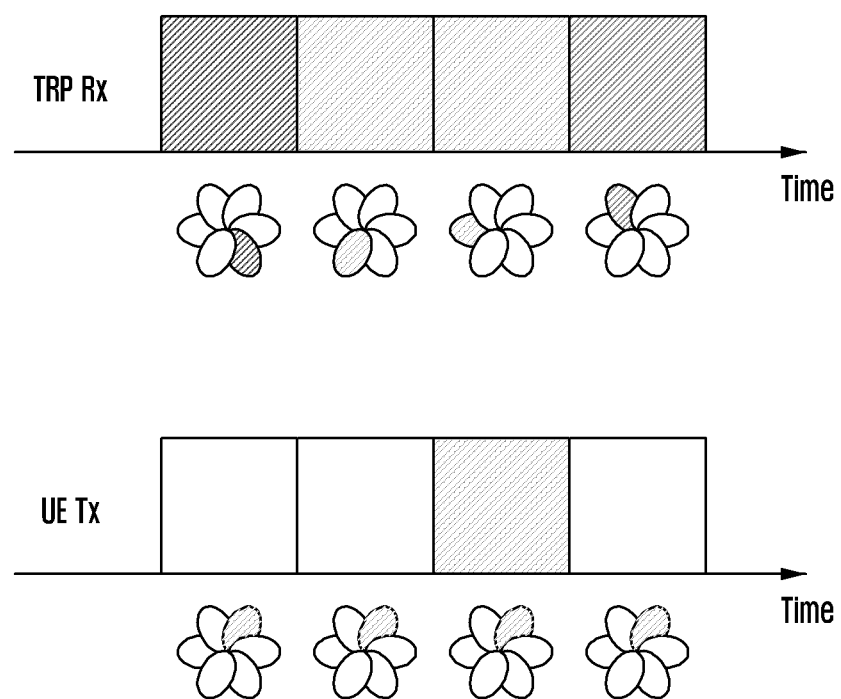

In another embodiment, the MSG1 transmission when UE 102 has beam correspondence but the target TRP/gNB 104b does not have the correspondence is shown in the FIG. 9.

Figure 10:
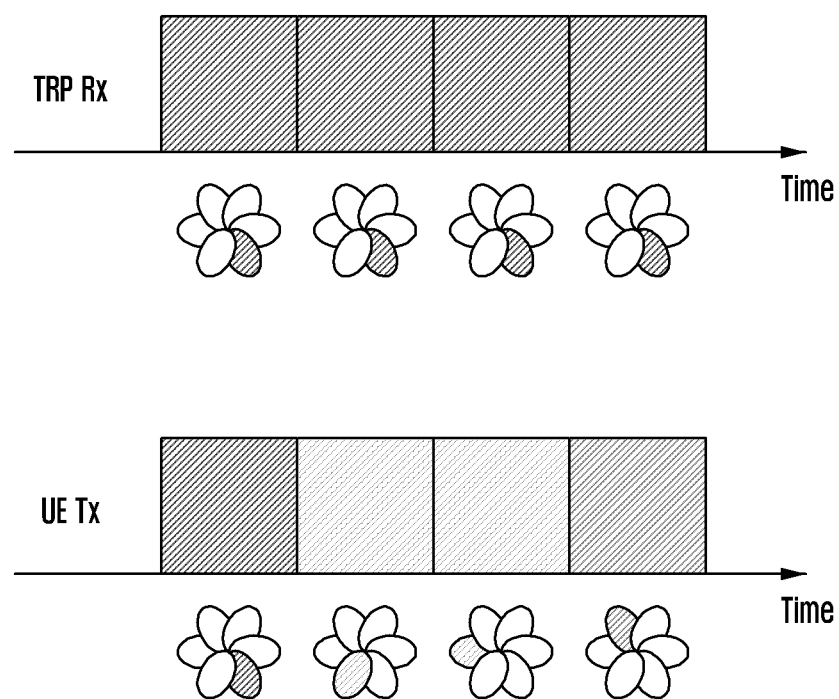

In another embodiment, the MSG1 transmission when the UE 102 does not have beam correspondence but target TRP/gNB 104b have the correspondence is shown in the FIG. 10.

Figure 11:
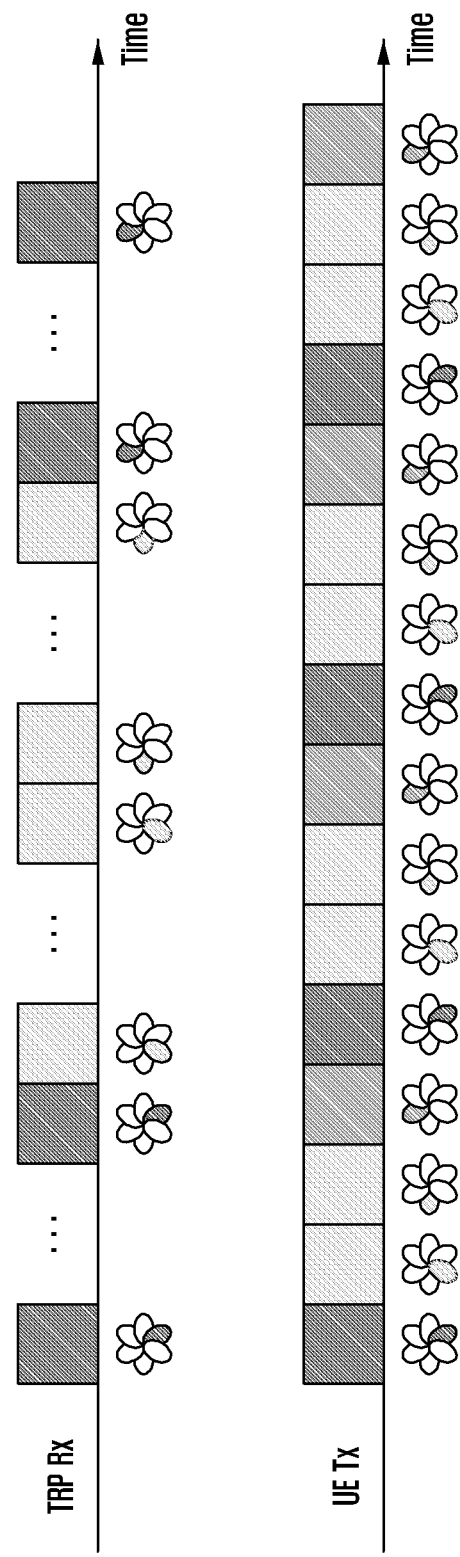

In another embodiment, the MSG1 transmission when the UE 102 and target TRP/gNB 104b have no beam correspondence, this procedure will be repeated for each target TRP/gNB Rx beam 'r' and for each UE Tx beam as shown in the FIG. 11.

Figure 12:
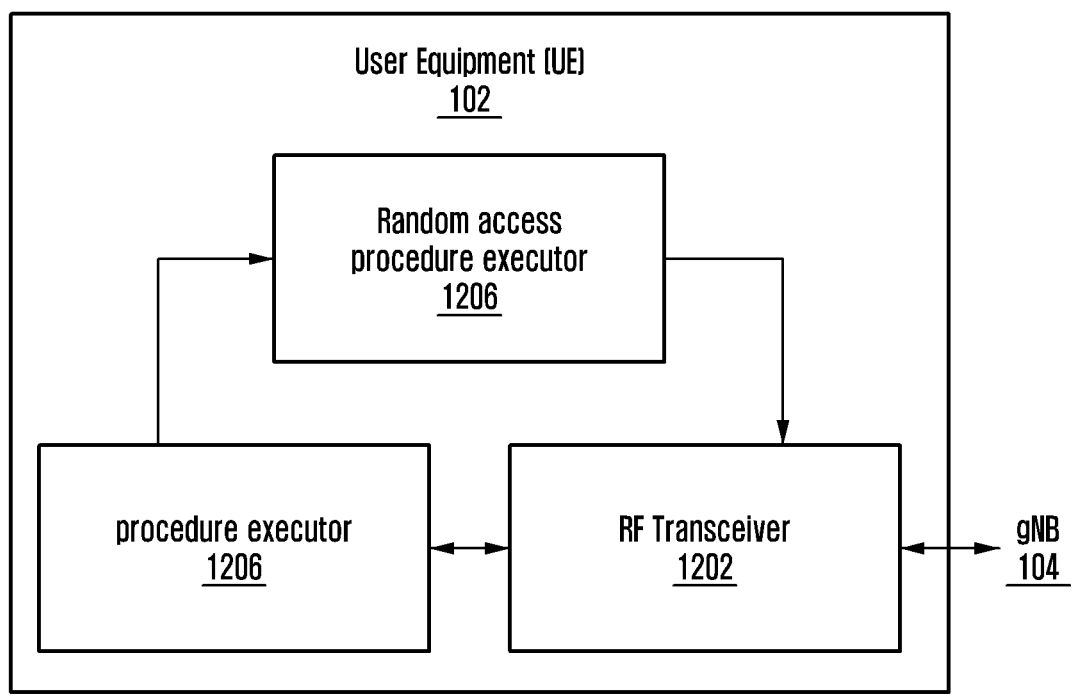
FIG. 12 is a block diagram of the UE for performing the random access procedure for the connected mode handover, according to an embodiment as disclosed herein.

FIG. 12 is a block diagram of the UE 102 for performing the random access procedure for the connected mode handover, according to an embodiment as disclosed herein. As depicted in the FIG. 12, the UE 102 includes a RF transceiver 1202, a message analyzer 1204 and a random access procedure executor 1206.

In an embodiment, the RF transceiver 1202 can be configured to communicate with the source gNB 104a and with one or more target gNBs 104b, 104c and so on. The UE 102 performs data communication with the source gNB 104a. The RF transceiver 1202 can include an antenna configured to communicate the configuration parameters (i.e., SIB messages and other control channel messages) with the target gNB 104b. The RF transceiver 1202 can be configured to transmit the measurement report of the target gNB 104b to the source gNB 104a after performing the measurement of the target gNB 104b either on the SS blocks or on the CSI-RS. Further, the UE 102 receives the handover command from the source gNB 104a through the RF transceiver 1202.

The UE 102, upon receiving the handover command message from source gNB 104a, analyzes information included in the handover command message at the message analyzer 1204, and executes the random access procedure through the random access procedure executor 1206 in the target gNB 104b after the handover.

Further, the random access procedure executor 1206 determines successful completion or failure of the handover procedure and the message generator/analyzer 1204 generates a message corresponding to successful completion or failure of handover according to the determination and transmits the message to the target gNB 104b through the RF transceiver 1202.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of performing a contention-free random access (CFRA) procedure for a connected mode handover, by a User Equipment (UE), the method comprising:
    performing measurement of at least one neighboring cell based on synchronization signal blocks (SSBs);
    transmitting a measurement report for the measurement to a source base station;
    receiving, from the source base station, a radio resource control (RRC) connection reconfiguration message for handover to a target base station, the RRC connection reconfiguration message including information on dedicated random access channel (RACH) resources for the CFRA, the information including an association between the dedicated RACH resources and the SSBs;
    identifying a RACH resource among the dedicated RACH resources based on the association; and
    performing the CFRA procedure for the handover to the target base station based on the RACH resource,
    wherein the RACH resource is associated with an SSB selected among the SSBs based on the measurement,
    wherein the information further includes a relation between a number of the SSBs and the RACH resource, and
    wherein the RRC connection reconfiguration message is based on a handover request message, including UE capability information, transmitted by the source base station to the target base station, and on a handover request acknowledgement message received by the source base station from the target base station.

2. The method of claim 1, wherein the measurement report comprises information on cell and information on beam of the target base station.

3. The method of claim 1, further comprising:
    receiving, from the source base station, configuration information on the measurement of the target base station.

4. The method of claim 1, further comprising:
    identifying the at least one neighboring cell based on the SSBs.

5. The method of claim 1,
    wherein a number of the dedicated RACH resources is one of a product of a number of beams in a synchronization signal corresponding to the SSBs and a number of UE beams.

6. A user equipment (UE) for performing a contention-free random access (CFRA) procedure for a connected mode handover, the UE comprising:

a radio frequency (RF) transceiver; and
at least one processor coupled with the RF transceiver and configured to:
- perform measurement of at least one neighboring cell based on synchronization signal blocks (SSBs),
- transmit, to a source base station via the RF transceiver, a measurement report for the measurement,
- receive, from the source base station via the RF transceiver, a radio resource control (RRC) connection reconfiguration message for handover to a target base station, the RRC connection reconfiguration message including information on dedicated random access channel (RACH) resources for the CFRA, the information including an association between the dedicated RACH resources and the SSBs,
- identify a RACH resource among the dedicated RACH resources based on the association, and
- perform the CFRA procedure for the handover to the target base station based on the RACH resource,
- wherein the RACH resource is associated with a SSB selected among the SSBs based on the measurement,
- wherein the information further includes a relation between a number of the SSBs and the RACH resource, and
- wherein the RRC connection reconfiguration message is based on a handover request message, including UE capability information, transmitted by the source base station to the target base station, and on a handover request acknowledgement message received by the source base station from the target base station in response to the handover request message.

7. The UE of claim 6, wherein the measurement report comprises information on cell and information on beam of the target base station.

8. The UE of claim 6, wherein the at least one processor is further configured to receive, from the source base station via the transceiver, configuration information on the measurement of the target base station.

9. The UE of claim 6, wherein the at least one processor is further is identify the at least one neighboring cell based on the SSBs.

10. The UE of claim 6,
wherein a number of the dedicated RACH resources is one of a product of a number of beams in a synchronization signal corresponding to the SSBs and a number of UE beams.

* * * * *